United States Patent [19]

Sincerbox et al.

[11] 4,249,796
[45] Feb. 10, 1981

[54] PROJECTION DISPLAY DEVICE

[75] Inventors: Glenn T. Sincerbox; Joseph G. Gordon, II, both of San Jose, Calif.

[73] Assignee: International Business Machines Corporation, Armonk, N.Y.

[21] Appl. No.: 50,590

[22] Filed: Jun. 21, 1979

[51] Int. Cl.³ .............................................. G02F 1/01
[52] U.S. Cl. ............................ 350/370; 350/347 V; 350/355; 350/357
[58] Field of Search ............... 350/147, 150, 355, 356, 350/357, 285, 347 V; 356/369

[56] References Cited
U.S. PATENT DOCUMENTS

| 2,185,379 | 1/1940 | Myers et al. | 350/285 |
| 3,307,897 | 3/1967 | Lohmann | 350/356 |
| 3,476,460 | 11/1969 | Hansen et al. | 350/290 |
| 3,612,653 | 10/1971 | Rajchman | 350/363 |
| 3,730,608 | 5/1973 | Castegnier | 350/363 |

FOREIGN PATENT DOCUMENTS 674294  4/1939  Fed. Rep. of Germany ........... 350/355

OTHER PUBLICATIONS

Otto, A. "Excitation of Nonradiative Surface Plasma Wares . . . " *Zeitschrift for Physik* vol. 216 pp. 398–410 (1968).

*Primary Examiner*—Richard A. Rosenberger
*Attorney, Agent, or Firm*—Joseph G. Walsh

[57] ABSTRACT

A projection display device is provided in which variation in the index of refraction is used to modulate attenuated total reflection.

8 Claims, 2 Drawing Figures

PROJECTION DISPLAY DEVICE

DESCRIPTION

1. Technical Field

The present invention is concerned with a device for projection display. In particular, it is concerned with a device in which variation in the index of refraction is used to modulate attenuated total reflection.

2. Background Art

U.S. Pat. No. 2,185,379 shows an electrically controlled light valve in which micro particles absorb light and diminish total reflection. U.S. Pat. No. 3,476,460 discloses electrically controlled light reflection. U.S. Pat. No. 3,612,653 shows a digital light deflector having liquid and vapor states. U.S. Pat. No. 3,730,608 shows a system used to modulate beams of light by generation of a gas medium against an electrode. RCA Technical Notes No. 883, Apr. 1, 1971, deals with use of internal strain within a prism to modulate total internal reflection.

None of the above art, nor insofar as we are aware, any prior art shows the control of surface electromagnetic waves by control of index of refraction in a medium adjacent to a film on a prism.

The projection display device of the present invention involves attenuation of total reflection when a film of material with a negative dielectric constant is placed in contact with the base of a prism. Polarized light which ordinarily would be totally reflected by that prism will be reflected in less than totality. That light which is not reflected is converted into surface electromagnetic waves, either plasmons or polaritons, at the surface of the film. The subject of attenuating total reflectivity by means of surface waves is discussed in *Zeitschrift fur Physik*, 216 pp 398–410, 1968.

DISCLOSURE OF THE INVENTION

Figure 1:
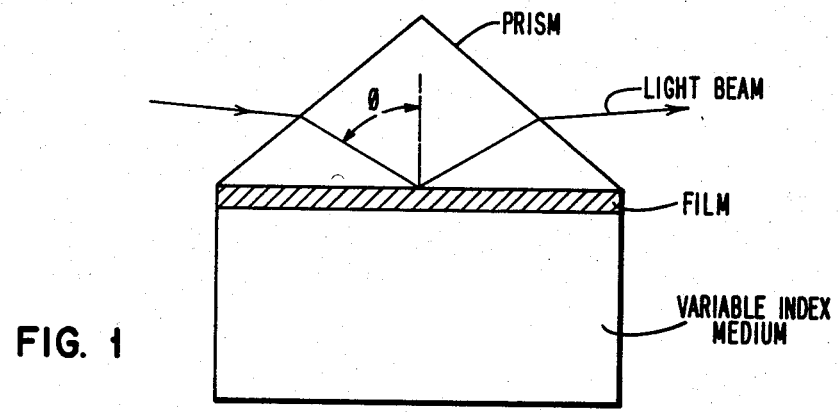
FIG. 1 is a cross-sectional view (not to scale) of a device of the present invention.

In the device of the present invention, projection display is achieved by the use of an attenuated total reflective element which spatially and temporally modulates the light intensity. As may be seen in FIG. 1, the prism, a film thereon, and a medium having variable refractive index in contact with the film, comprise the display device. The light intensity is controlled by a variation in the refractive index of the medium near the film.

Plane polarized light, having its E-vector in the plane of incidence, is incident on the base of the prism, which has been coated with a thin film on the order of a few hundred angstroms thick. This film is of a material with a negative dielectric constant at the frequency of irradiation. This material is usually a metal such as copper, silver or gold, but it can also be an organic material. When the material is a metal, the surface electromagnetic wave is a plasmon; when it is nonmetallic, the wave is a polariton. Normally the reflection from the glass-film interface is high when the angle of incidence $\phi$ is greater than the critical angle. For plane polarized light, however, there exists a particular angle of incidence at which the reflectivity is low. This is the angle at which a surface electromagnetic wave is excited at the interface of the film and the variable index material. The light energy coupled into this oscillation is dissipated in the film. The reflectivity under these conditions is primarily dependent upon the thickness of the film and can in principle be zero. With light incident at the angle for minimum reflectivity, an alteration of the refractive index of the material adjacent to the film destroys the resonance condition and causes the reflectivity to increase. The refractive index may be changed in any of several ways, thereby causing a change in reflectivity. The preferred means for changing the refractive index is electrochemical, but other methods such as photochromism, electrochromism, electrophoresis or molecular reorientation may also be used.

The prism in the device of the present invention need not be triangular. What is required is that it have a base, which is in contact with the film which has a negative dielectric constant. In addition to the base, the other surface or surfaces of the prism may be curved or planar, or any combination thereof. The simplest prism is, of course, a triangle, as shown in the drawings. Alternatively, it may be hemispherical, hemicylindrical or trapezoidal.

Best Mode for Carrying Out the Invention

In the preferred embodiment of the device of the present invention, the film of material having a negative dielectric constant constitutes one electrode in an electrochemical cell. Electrodeposition of an organic film on this electrode changes the refractive index and causes reflectivity to increase. Hence, electrically controlled deposition and removal of the organic film controls the reflectivity from the base of the prism and thereby controls the intensity of the light transmitted. The electrode may consist of individually addressable elements, for example, in a x,y matrix array, so that arbitrary patterns may be generated for the projection of two-dimensional images.

Figure 2:
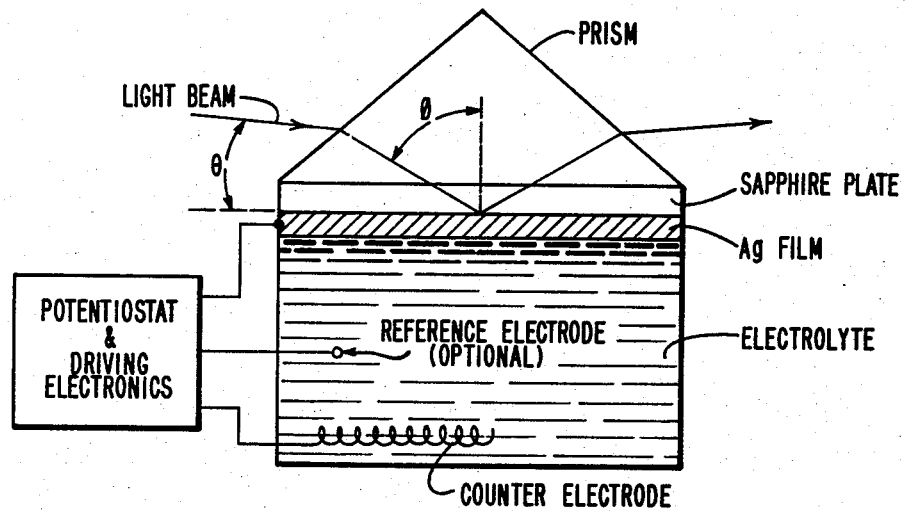
FIG. 2 is a cross-sectional view (not to scale) of one preferred embodiment of the present invention.

Turning again to FIG. 2, we see a specific embodiment of the preferred device of the present invention. A LaSF5 prism (n=1.88, base angle=45°) is placed in optical contact (index matching liquid) with a sapphire slide (n=1.77) upon which a layer of silver has been evaporated. The layer of silver has a thickness of from between 300 to 500Å units. The electrode is an aqueous solution, 0.3M in KBr and 0.0113M in heptylviologen bromide. A three-electrode cell is employed and potentials are measured versus an Ag/AgCl reference electrode. The light source is a HeNe laser (6328Å units).

With no organic film deposited the minimum reflectivity occurred at theta=31° ($\phi$=57.3°). The reflectivity was 12.5%. Upon stepping the potential from −0.3 to −0.5 volts, a film of viologen radical cation was deposited and the reflectivity increased to a limiting value of 55.6%. This limiting value represents a contrast ratio of 4.4. The reflectivity is a continuous function of the charge passed, which in turn is a measure of the thickness of the film. The charge in micro coul/cm² experimentally required to obtain a given contrast ratio of reflectivity is given in the table below.

| CONTRAST ($R/R_{min}$) | R (%) | Q (mC/cm²) |
| --- | --- | --- |
| 1 | 12.5 | 0 |
| 2 | 25 | .34 |
| 3 | 37.5 | .83 |

| CONTRAST (R/R$_{min}$) | R (%) | Q (mC/cm$^2$) |
|---|---|---|
| 4 | 50 | 1.86 |

Since the maximum reflectivity in most systems will be about 60%, the contrast ratio is determined primarily by the value of the minimum reflectivity. This is a function of the thickness of the metal film. We have obtained silver films which have a minimum reflectivity of less than 2%, resulting in a potential contrast ratio of better than 30:1 for 2 mC/cm$^2$. Attaining these low values is a matter of controlling the deposition conditions.

The device of the present invention has several advantages. Only a small deposit is required. Writing speed is quite rapid; contrast is high and lifetime is long. Furthermore, the deposited film need not be colored. Still an additional advantage is that the change in refraction index needs to occur over only a small depth of the medium, i.e. on the order of about 0.1 microns or less.

We claim:

1. A projection display device comprising:
   (a) a prism having a base;
   (b) a thin film of material having a negative dielectric constant and having one side in optical contact with the base of said prism, and a second side;
   (c) a medium of variable refractive index in contact with said second side of said film;
   (d) means to pass a beam of light which is plane polarized in the plane of incidence onto the base of said prism at an angle to excite a surface electromagnetic wave at the interface between said medium and said film; and
   (e) means to vary the refractive index of said medium.

2. A device as claimed in claim 1 wherein the refractive index of the medium is varied by means of an electrochemical reaction.

3. A device as claimed in claim 1 wherein the refractive index of the medium is varied by means of a photochromic reaction.

4. A device as claimed in claim 1 wherein the refractive index of the medium is varied by means of electrochromism.

5. A device as claimed in claim 1 wherein the refractive index of the medium is varied by means of electrophoresis.

6. A device as claimed in claim 1 wherein the refractive index of the medium is varied by means of molecular reorientation.

7. A device as claimed in claim 1 wherein said surface electromagnetic wave is a surface plasmon.

8. A device as claimed in claim 1 wherein said surface electromagnetic wave is a surface polariton.

* * * * *